United States Patent [19]
Erchak et al.

[11] 3,859,117
[45] Jan. 7, 1975

[54] COATED GLASS CONTAINER

[76] Inventors: Michael Erchak, 409 Ridge Rd., Ridgewood, N.Y. 14845; Edward R. Campagna, 289 Brookmere Ct., Horseheads, N.Y. 07450

[22] Filed: Mar. 7, 1972

[21] Appl. No.: 232,589

[52] U.S. Cl.............. 117/94, 117/123 D, 215/1 C, 215/12 R, 215/DIG. 6
[51] Int. Cl............................................ B65d 23/08
[58] Field of Search.......... 117/94, 123 D; 215/1 C, 215/12 R, DIG. 6

[56] References Cited
UNITED STATES PATENTS

| | | | |
|---|---|---|---|
| 3,083,854 | 4/1963 | Lusher | 215/12 R |
| 3,189,207 | 6/1965 | Heyne et al. | 215/12 R |
| 3,379,559 | 4/1968 | Gerhardt | 215/1 C |
| 3,480,160 | 11/1969 | Lee | 215/1 C |
| 3,604,584 | 6/1969 | Shanks | 215/12 R |

*Primary Examiner*—Michael Sofocleous
*Assistant Examiner*—William R. Trenor
*Attorney, Agent, or Firm*—Paul R. Wylie

[57] ABSTRACT

This invention generally relates to glassware. More specifically, it relates to glassware of the type adapted to contain carbonated beverages having improved durability and resistance to shattering.

4 Claims, 2 Drawing Figures

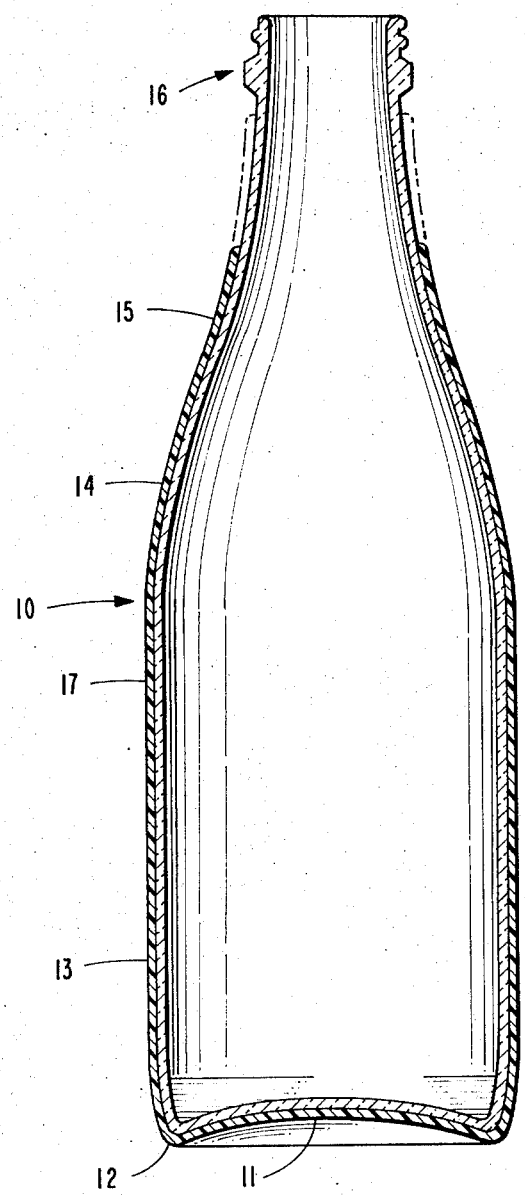

COATED GLASS CONTAINER

BACKGROUND OF THE INVENTION

Conventional glass bottles, and particularly those that are used to package pressurized liquids such as carbonated beverages and the like, are susceptible if improperly impacted with sharp objects of sending glass fragments flying, sometimes with considerable force. While for the most part conventional glass containers are safe, nevertheless an improvement in the margin of safety is desirable.

Glass containers in the past have been provided with coatings for protection against scratches and to enhance safety. One class of such coatings are generally known as lubricity coatings such as, for example, the coating disclosed in U.S. Pat. No. 3,420,693. In that type of coating, relatively thin layers of protective material are applied to the surface of the glass mainly to protect it during manufacture, inspection, shipping, and filling by providing a surface lubricity to enable the bottles when they come in contact to easily slip by one another without abrasion with concomitant introduction surface flaws and reduced bottle strength.

Relatively thicker coatings than the lubricity coatings have also been applied to glass bottles used as aerosol containers. With respect to glass aerosol containers, a relatively heavy coating is required to protect against flying of glass fragments due to the high propellant pressure present in the aerosol bottle. Coatings have also been applied to non-aerosol bottles as, for example, shown in the U.S. Pat. No. 3,178,049 to Cottet. That patent contemplates a bottle having a thin glass wall thickness in the neighborhood of 6 to 30 thousandths inches and a coating that is at least equal to the thickness of the glass and perhaps thicker. Thus, this prior art bottle is more a plastic bottle with a glass liner than a glass bottle with a plastic coating.

The instant invention in contrast to the prior art concerns itself with coatings for glass bottles of conventional design and having a glass weight more or less in the range of conventional glass bottles. By providing a coating for use on conventional bottles, considerable economic advantages are obtained inasmuch as special molds for the glass and special handling techniques for the glass are not required nor are special designs for the bottles.

BRIEF SUMMARY OF THE INVENTION

There is provided according to this invention glassware having improved durability and resistance to shattering comprising a glass container and a coating that extends at a substantially constant thickness substantially completely over the main exterior surface of the glass container. By "main surface" of the glass container is meant the entire surface, including the bottom sidewalls and the neck portion of conventional glassware except the neck finish and a portion of the neck immediately adjacent to the neck finish. The coating, according to the invention, is formed of a solid thermoplastic material that is preferably a resilient locally distortable thermoplastic which is partially adhered to the container at spaced points over the main surface. The coating is further preferably under tension to provide compressive strength and of a thickness sufficient to provide impact resistance to the container. The partially adhered coating as explained below is a significant feature of the invention and is important in combination with the added hoop strength and impact resistance provided by the coating. It has been found that the containers of this invention have improved impact and pressure strength characteristics which make them more resistant to breaking than conventional bottles. Moreover, when broken, the bottles will not shatter and eject glass fragments even though the bottle contains a carbonated beverage.

It was the object of this invention to provide a container having improved durability and resistance to shattering.

It was a further object of this invention to provide such a container that could be made from conventional glass components.

It was a further object of this invention to provide a container that would be safer than conventional glass containers without added or increased costs.

BRIEF DESCRIPTION OF THE DRAWINGS

The invention is illustrated by the accompanying drawings showing a specific embodiment thereof and wherein:

FIG. 1 is an elevation of a bottle according to the invention shown in cross section; and, FIG. 2 is an enlarged fragmentary sectional view of a portion of the wall of the container shown in FIG. 1 illustrating details of the adhesion of the coating to the glass substrate.

DETAILED DESCRIPTION OF THE INVENTION

The glass bottles used according to the invention can be conventional glass containers. A typical example of such a container would be a 28 ounce capacity glass container having about 17 ounces of glass and a mean side wall thickness in the range of about 0.1 ins. to about 0.14 ins. As shown in FIG. 1, such a glass container 10 has a slightly concave bottom portion 11, known as a "push-up" in the glassware industry, rounded portions 12 extending from the bottom portion to straight side walls 13, and a rounded portion 14 extending from the straight side walls to a conical neck portion 15 which terminates in the finish 16 of the bottle. It may be desirable to form the rounded portions connecting the side walls to the bottom and to the neck in a slightly bulbous contour which may be knurled. Although the current invention contemplates that conventional glassware can be coated, due to certain strength characteristics imparted to the glass by the coating in accordance with the invention, it is a feature of the invention that the weight of the glass can be reduced somewhat to result in a glass container having substantially thinner walls than those of conventional glassware.

The coating 11, according to the invention, extends substantially completely over the main surface of the glass container. By the term "main surface" it is meant that the entire exterior surface of the glass container is covered except for the finish and a short portion of the neck extending downwardly from the finish. However, at least 95 percent of the available surface of the glass container is covered, and possibly more depending to some extent on the process and equipment used for applying the coating.

The coating is formed of a solid resilient locally distortable thermoplastic material that is partially adhered to the container. By the term "partially adhered" it is meant that uniformly over the coated surface of the glass there are areas of adhesion of the coating to the glass interspersed with areas that are not adhered. Thus, while the coating is adhered relatively uniformly over the entire surface, the adhesion is not continuous but intermittent. This is seemingly an important aspect of the invention inasmuch as the bottles, according to this invention, have been shown to have improved characteristics with respect to shatterproofness when compared with similar bottles having a completely adhered coating. Moreover, the partially adhered coating of the invention is adhered sufficiently to withstand caustic washing to which beverage bottles are commonly subjected and will not be loosened by differential expansion when the bottle is subjected to temperature changes. Further, the partially adhered coating is sufficiently adhered to prevent liquids or other materials from becoming entrapped between the coating and the bottle.

Seemingly, the partially adhered coating acts in the following manner when a pressurized bottle is broken: In the case of breakage of bottleware under internal pressure the contents of the bottle begin to flow through the break. Simultaneously, the sharp pieces of glass at the location of the glass break puncture the coating thus allowing the internal pressure to be released. Glass fracture lines will spread from the break to other parts of the bottle. The coating separates from the glass over these fracture lines and stretches as the glass separates, holding the pieces on either side of a fracture line together, while the internal pressure is completely dissipated through the initial rupture. Glass particles will remain adhered to the plastic coating which will tear but not completely sever itself from the major portion of the glass container. In this manner the glass fragments are prevented from being violently scattered to cause damage to nearby persons or objects.

As noted, the coating is also one in which there is tension. This tension provides a hoop strength around the glass portion of the container which seemingly requires increased internal pressurization to break the coated bottle. While it is not known exactly the tension of the coatings of the invention, nevertheless it appears that the coatings formed of the preferred plastics according to the invention provides sufficient tension as demonstrated to enhance the pressure retaining characteristics of the bottle and thereby enhance the safety of such bottle.

An important feature of the invention is the provision of impact resistance in the coating to protect the coated bottle from fracturing under impact from solid or sharp objects. In this aspect of the invention, the coating may act as a shock absorber if applied in sufficient thickness. While the coating and the glassware thicknesses together contribute to the impact resistance of the coated glassware article, it nevertheless appears desirable to have a coating thickness in the range of 0.006 to 0.030 ins. for good results. Such a coating when used on glassware having a thickness in the range of 0.030 to 0.100 ins. will result in an impact resistance of the coated glassware article of at least 120 ins. per second.

It is presently preferred to use glassware having a mean thickness over the main surface thereof in the range of about 0.006 to about 0.150 ins. Of this range, a still further preferred range is that having 0.030 to about 0.120 ins. mean thickness. The coating for the glassware as noted above should be in the range of 0.006 ins. to about 0.030 ins. for best results. The presently preferred coating thickness in this range is that having a mean thickness of 0.008 to about 0.016 ins.

While it is contemplated that partial adherence of the coating to the glass container may be accomplished in a number of ways, one manner in which such partial adherence is accomplished is by controlling the acid number of the polymeric coating material and thereby controlling the reaction of functional groups of the coating with silanol groups present on the surface of the glass container.

Specific embodiments of the invention wherein partial adhesion is obtained by controlling acid numbers utilize coating material that has been prepared by physical blending of a polyethylene base resin with at least one acidic polymeric material taken from the group consisting of oxidized polyolefins, oxidized waxes and polymers comprising an ethylenically unsaturated carboxylic acid or acid anhydride. The concentration of base resin in the blend of base resin and acidic polymeric material should be at least 60 percent by weight, and preferably at least 80 percent. The relative amounts of base resin and acidic polymeric material are such that the acid number of the total coating material is at least 0.5 to ensure adequate partial adhesion of the coating material to the glass. In order to prevent too great adhesiveness the acid number should not exceed about 20, preferably the acid number should be maintained in the range from about 1 and about 15. More preferably, the acid number should be maintained in the range from about 1 to about 9. The acid number is determined by the method used for determination of acid value of fatty acids, and designates the number of milligrams of potassium hydroxide required for neutralization of one gram of test material. The determination is performed by titrating an alcoholic solution of the material with alkali using phenolphthalein as indicator. (ASTM Method No. D1980-67)

The ethylenically unsaturated acidic monomer of the polymeric material can be a mono-carboxylic acid, a polycarboxylic acid or an acid anhydride, either one preferably having from 3 to 8 carbon atoms per molecule, or a partial ester of a polycarboxylic acid or mixtures of two or more of the aforementioned acidic compounds. Examples of such acidic monomers are acrylic acid, methacrylic acid, ethacrylic acid, crotonic acid, fumaric acid, maleic acid, itaconic acid, vinyl sulfonic acid, maleic anhydride, monomethyl and mono-ethyl esters of maleic acid and fumaric acid. The polymeric material can be a homopolymer or a copolymer of the above mentioned compounds with one or more other monomers, such as lower alpha-olefins, e.g., ethylene, propylene, butene-1, or vinyl monomers such as styrene, vinylacetate, esters of acrylic and methacrylic acid and similar compounds.

Specific examples of acidic polymeric materials encompassed within this invention are polyacrylic acid, and copolymers, such as ethylene/acrylic acid copolymers, ethylene/methacrylic acid copolymers, ethylene/ethacrylic acid copolymers, ethylene/crotonic acid copolymers, ethylene/fumaric acid copolymers, ethylene/maleic acid copolymers, ethylene/itaconic acid copolymers, ethylene/vinyl sulfonic acid copolymers, ethylene/maleic anhydride copolymers, ethylene/mono-methyl maleate copolymers, ethylene mono-ethyl maleate copolymers, ethylene/monomethyl fumarate copolymers, ethylene/mono-ethyl fumarate copolymers. Also specifically included are the copolymers of lower alphaolefins other than ethane having between 3 – 6 carbon atoms per molecule, with any one of the acidic monomers disclosed above, e.g., those including propylene, butene-1, 3-methyl butene-1, and 4-methyl pentene-1. Other specific examples of suitable copolymers are terpolymers of two different alpha-olefins and one of the acidic monomers specifically disclosed above, as well as terpolymers of an alpha-olefin, one of the above disclosed acidic monomers and a vinyl compound such as vinyl acetate, vinyl chloride, vinyl alcohol, vinyl ethers, vinyl fluoride and similar compounds.

The above compounds and their respective methods of preparation are all known in the art and need not be discussed here in any detail.

The polyethylene base resin to be blended with the aforementioned acidic polymeric material should be one that contains a substantial amount of short chain branches along with some long chain branches to render it resilient and to assure that it exhibits high ultimate elongation and high tensile strength at break. It can be a homopolymer or a copolymer of ethylene with at least one other comonomer which will provide additional short chain branches onto the main polymer chain. Examples of suitable comonomers are alpha-olefins other than ethylene, e.g., propylene, butene-1, 3-methyl-butene-1; 4-methyl pentene-1; vinyl compounds including styrene, vinyl esters, vinyl ethers, vinyl chloride, vinyl fluoride, vinyl alcohols; vinylidene compounds such as vinylidene chloride or fluoride, esters such as for instance the ethyl or vinyl esters of acrylic acid, methacrylic acid, substituted methacrylic acids, crotonic acid, itaconic acid, maleic acid or fumaric acid; acrylonitrile, fumaronitrile; acrylamides; vinylene carbonate; carbon monoxide; and other similar compounds. The comonomer content of the base resin should be maintained at a relatively low level, generally below about 20 percent by weight and preferably in the range from about 2 to about 7 percent by weight, in order to ensure that the resin will not become too rubbery and that its tensile strength at break and ultimate elongation are maintained above the minimum levels of about 1,000 psi and 200 percent respectively. However, in the case of comonomers of small molecular volumes such as carbon monoxide, vinyl fluoride, vinylidene fluoride and vinyl alcohol the broad upper limit can be raised to about 50 percent by weight. Increasing the comonomer content from 0 percent to its maximum permissible value will result in a corresponding increase of the clarity of the base resin ranging from an opaque state to a substantially clear state. Also, such an increase will usually result in a corresponding lowering of the melting point and inherently in the temperature required for the subsequent application of the coating material to the glass substrate. Thus, inclusion of a comonomer in the polyethylene base resin will aid in minimizing or obviating any degradation of the coated material due to excessive treatment temperatures. The comonomer content will vary from case to case, depending upon the particular qualities desired of the final coating, and it is also affected by other variables such as the selection of comonomer, the composition of the acidic polymeric material and the percentage of such acidic polymeric material in the blend. A random copolymer of ethylene and vinyl acetate, where the vinyl acetate content ranges between about 2 and about 7 percent by weight based on the base resin, is one such base resin particularly suitable for the present invention.

A requirement for any one of the above disclosed polyethylene resins is that its melt index will not exceed 100 as determined by ASTM method No. D-1238 and preferably should be below about 10. Another requirement is that its density does not exceed above about 0.945 as determined by ASTM method No. D-1505, and is preferably maintained between about 0.915 and about 0.930. A third requirement is that the intrinsic viscosity should be at least 0.5 deciliters/gm determined by modified ASTM method D-1601 (alpha-chloronapthalene at 125°C) and is preferably maintained between about 0.65 and about 0.90 deciliters/gm. When these three criteria simultaneously are met the base resin exhibits high resiliency and toughness as evidenced by a tensile strength at break of at least 1,000 psi, (determined by ASTM method No. D-638) and by an ultimate elongation of at least 200 percent, (determined by ASTM method No. D-638).

The polyethylene base resins used can be prepared by any conventional method, e.g., the process of U.S. Pat. No. 3,293,233, at pressures from about 1,000 atmospheres to about 3,000 atmospheres and at temperatures in the range from about 90° to about 300°C in the presence of peroxide catalysts. The reaction is usually carried out employing a relatively narrow temperature range within the above mentioned broad range of operable temperatures.

Appropriate quantities of the polyethylene base resin and the acidic polymeric material are blended together under conditions assuring that the acidic polymeric material be dispersed substantially uniformly throughout the blend. Conventional methods such as melt blending or powder blending techniques can be employed therefor or a combination of the two methods. It is also within the scope of this invention to incorporate the acidic polymeric material into the coating by depositing it as a thin layer onto the surface of particles of the polyethylene base resin, e.g., by impregnation of particulate polyethylene base resin with the acidic polymeric material dissolved in a suitable solvent, followed by a drying step to drive off the solvent.

A particularly advantageous embodiment of this invention is a coating prepared by powder blending of the components for a sufficient time in any known equipment suitable therefor to obtain a uniform mixture of the coating material. After application of the coating material to the surface of the glass articles followed by a curing step, the resulting coating will adhere extremely well in the locations where particles containing the acidic polymeric material were deposited onto the glass surface, while in the locations where polyethylene base resin particles were deposited onto the glass surface the coating adheres with considerably less tenacity. Thus, a coating is obtained which adheres uniformly but in a spotty fashion to the glass surface and which upon failure of the glass will release therefrom in the desired manner to render the glassware "shatterproof."

Although it does not matter for the "shatterproofness" whether the points of adherence of the coating to the glass are uniformly disposed in clusters as obtained in connection with powder blends, each acidic polymer particle providing one such cluster, or in a uniform non-clustered fashion as obtained by application of a melt-blended coating material to the glass substrate, there is a distinct advantage to coatings prepared by powder blending method in that the amount of acidic polymeric material for a given degree of adhesion can be reduced. This is especially the case for blends containing particulate acidic polymeric material of lesser particle size than that of the polyethylene base resin. Thus, the preferred acid number of the coating material when prepared according to the powder-blending technique should range between about 1 and 9.

If desired, various dyes, pigments and/or fillers may be incorporated into the blend for achievement of desired color and/or surface effects. For instance, in the case of melt blended coating materials, coloring can be added by first preparing a color concentrate, such as a mixture of dry pigments and/or dyes with a suitable carrier such as a polyethylene of relatively high melt index, e.g., about 20. A small amount of the prepared concentrate is then melt blended with the coating material mixture, extruded, ground, and screened to proper particle size. In the case of powder blends, coloring can be added in the above described fashion to each of the components prior to blending. Alternately, pigments and/or dyes can be added to the blend itself in dry form, as a paste, as a colloidal dispersion in mineral oil or water, or as a dye solution and subsequently subjected to mixing, preferably high-energy mixing. Equipment such as a Henshel mixer, a ribbon-blender or a ball mill may be used therefor.

The particle size of the final coating material to be applied by any of the conventional powder application techniques should generally range between about 25 mesh and about 250 mesh (Tyler screen) and preferably between about 35 mesh and about 75 mesh. A grinding operation employing any of the known techniques based on high shear impact, followed by screening of the ground material are therefore required to obtain the final coating material of desired particle size. These steps can be carried out before or after admixture of the components of the coating material.

The final coating material is then applied to the glass substrate using methods of application including emulsion, spray, electrostatic and fluidized bed application techniques. After application the coating is cured employing known conditions therefor. Regardless of what techniques are used for the application of the coating material to the glass substrate, conditions should be such that only a relatively thin layer of resilient coating is applied thereby. It may sometimes be desired to increase the lubricity of the coating. This can be achieved, for instance, by providing the coated article with a very thin final coating of a suitable material or by incorporating a lubricating agent into the coating material itself using techniques similar to those described above for incorporation of dyes, pigments or fillers.

In order to provide a better understanding of the advantages of the invention, reference is had to the following examples:

Examples 1–6

Beverage bottles were coated with various particulate materials employing fluidized bed coating techniques. In all cases the coating materials were comminuted and screened to 35 mesh Tyler screen prior to being charged to the fluidization chamber, which was equipped with means for introducing a fluidized gas of relatively low superficial velocity to provide operations at dense, non-turbulent fluidized bed conditions. Beverage bottles having a mean wall thickness of about 0.080 were preheated to temperatures in the range from about 425° to about 475°F, dipped into the fluidized bed for 2 – 5 seconds to acquire coatings about 0.008 ins. to about 0.014 ins. thick, and then cured in a curing oven at temperatures between about 425° and about 475°F for 4 to 6 minutes after which they were allowed to cool for at least 24 hours before being tested. The coated bottles were then tested for surface appearance and adherence of the coating to the glass. Surface appearance was rated either "poor" or "good," a "poor" rating being given when there was evidence of pock marks and blistering of the coating. As to adhesion test, the samples were rated on a scale from 1 to 5, the definition of the respective ratings being as follows:

1. Strips off easily - inner surface of coating is smooth.
2. Strips off with difficulty - inner surface is rough.
3. Chips off - does not strip.
4. Chips off with difficulty.
5. Extremely difficult to chip.

The bottles were then filled with carbonated water to an internal pressure of about 65 psig, capped and tested for "shatterproofness." The latter tests were performed in a 4×4 ft. square enclosure having a concrete floor, lucite walls measuring 4 ft. in height and a lucite covering having a central opening of sufficient diameter to permit the dropping of the test bottles through the opening onto the concrete floor. "Shatterproofness" was rated poor, good, or excellent in accordance with the definitions therefor given below:

SHATTERPROOFNESS

Poor — Bottle breaks up into at least 3 – 4 pieces, top section of bottle breaks up and finish area of bottle may fly off;

Fair — Bottle sometimes breaks up into 3 – 4 pieces, other times it holds its shape with a rupture up the length of the bottle;

Good — Bottle maintains shape, all pieces cling together even though a slit may run ¼ of the way up the front of the bottle;

Excellent — Bottle holds shape — only rupture is at bottom where pressure is released and no large slit occurs.

These comparative examples show the effects of varying the adhesion by varying the acid number and base resin content of the coating material upon appearance adhesion and shatterproofness. The polyethylene base resin was a copolymer of 97 weight percent ethylene and 3 weight percent vinyl acetate having a density of 0.924, a melt index of 0.9, an intrinsic viscosity of 0.84, a tensile strength at break of about 1,900 psi and an ultimate elongation of 620 percent. The acidic polymeric material was a copolymer of 6 weight percent acrylic acid and 94 weight percent ethylene having an acid number of 46.7. Powder blends were prepared containing 5, 10, 15, and 20 weight percent respectively of the ethylene/acrylic acid polymer and bottles were coated with these blends as well as with 100 percent polyethylene base resin and with 100 percent ethylene/acrylic acid polymer. Table I below summarizes the pertinent data from these experiments.

TABLE I

| Example No. | Base Resin Wt. - % | Acidic Polymer Wt. % | Acid No. | Adherence | Shatter-Proofness | Appearance |
|---|---|---|---|---|---|---|
| 1 | 100 | 0 | 0 | 1 | Excellent | Poor |
| 2 | 95 | 5 | 2.34 | 2 | Excellent | Good |
| 3 | 90 | 10 | 4.67 | 3 | Good | Good |
| 4 | 85 | 15 | 7.01 | 4 | Good | Good |
| 5 | 80 | 20 | 9.34 | 4 | Fair | Good |
| 6 | 0 | 100 | 46.7 | 5 | Poor | Good |

It will be observed that even though the bottle in Example I had a "shatterproofness" rating of excellent, it nevertheless was not considered to have sufficient adhesion between the coating and the glass to be acceptable for caustic washing and to withstand thermal shock as noted previously.

Example 7

A number of 28 ounce capacity beverage bottles having approximately 17 ounces of glass per bottle were produced from various molds under substantially identical conditions. Approximately ½ of the bottles, which have an average wall thickness of about 0.140, were coated with a polymer mixture consisting of about 80 percent by weight of a low density polyethylene-vinyl acetate copolymer containing about 3 percent vinyl acetate and about 20 percent by weight of a low density polyethylene-acrylic acid copolymer containing about 6 percent acrylic acid as in Examples 1–6. The coating was applied by dipping hot bottles in a fluidized bed of the material. A polymer coating having a mean thickness of about 0.012 ins. was obtained. Approximately ½ of the coated and ½ of the uncoated were abraded for 1 minute on a standard laboratory line simulator to approximate the abrasion in a customer's filling line. The bottles were then subjected to pressurization until failure of the bottles according to Table II.

An examination of Table II reveals that the bare bottles dropped 12 percent in pressure strength when abraded while the coated bottle (Comparison No. 2) dropped only 2 percent. Comparison No. 3 shows an improvement in pressure strength.

It was observed that the bare bottles that broke shattered with pieces being expelled to the walls of the enclosure whereas the coated bottles did not shatter and pieces were not expelled due to the adherence of practically all pieces to the coating which, even though ruptured at places, still did not completely tear away from the rest of the coating.

Example 8

Following the same procedure used in Example 7 for the selection and preparation of bottles impact, tests were conducted on empty bottles. The tests were conducted with an enclosed Preston Impact Tester with the point of impact being at the knurled upper bulb portion of the bottles. The results of the test are shown in Table III.

TABLE II

Internal Pressure (PSI - 1 minute sustained equivalent) of bare versus coated bottles (28 oz. beverage at about 17 oz. glass weight).

| Mold No. | No. of Bottles Tested in Each Test* | Bare Bottles | | | | | | Coated Bottles | | | | | |
|---|---|---|---|---|---|---|---|---|---|---|---|---|---|
| | | Not Abraded | | | Abraded | | | Not Abraded | | | Abraded | | |
| | | Min | Max. | Ave. | Min. | Max. | Ave. | Min. | Max. | Ave. | Min. | Max. | Ave. |
| 15 | 6 | 216 | 475 | 385 | 259 | 288 | 277 | 311 | >590** | >455 | 232 | >590** | >435** |
| 1 | 6 | 150 | 398 | 275 | 210 | 300 | 258 | 228 | 427 | 473 | 319 | >590** | >483** |
| 12 | 6 | 132 | 367 | 271 | 232 | 326 | 286 | 243 | 454 | 371 | 281 | 451 | 379 |
| 3 | 6 | 257 | 462 | 372 | 271 | 335 | 312 | 309 | >590** | >490** | 346 | >590** | >482** |
| 14*** | 6*** | 207 | 360 | 276 | 190 | 308 | 267 | 287 | 521 | 384 | — | — | — |
| 10 | 6 | 255 | 441 | 363 | 235 | 326 | 289 | 241 | 579 | 409 | 316 | 532 | 399 |
| 8 | 6 | 184 | 413 | 325 | 246 | 363 | 294 | 327 | 498 | 447 | 259 | 47 | 396 |
| 17 | 6 | 176 | 292 | 255 | 212 | 333 | 273 | 363 | 466 | 433 | 242 | 497 | 316 |
| 18 | 6 | 272 | 402 | 337 | 241 | 322 | 277 | 265 | 549 | 411 | 436 | 520 | 478 |
| Average | | | | 318 | | | 281 | | | >430** | | | >421** |

Comparison No. 1  Bare (Not Abraded) –Bare Abraded)/Bare (Not Abraded=318–281/318=–12%  (Abraded bare bottle is 12% weaker than not abraded bare bottle.)

Comparison No. 2  Coated (Not Abraded – Coated Abraded)/Coated (Not Abraded)=430–421/430=–2%  (Abraded coated bottle is 2% weaker than not abraded, coated bottle.)

Comparison No. 3  Coated (Not Abraded) – Bare (Not Abraded)/Bare (Not Abraded)=430–318/318=+35%  (Not abraded coated bottle is 35% stronger than the not abraded bare bottle.)

Comparison No. 4  Coated (Abraded) – Bare (Abraded)/Bare (Abraded)=421–281/281=+50%  (Abraded coated bottle is 50% stronger than the abraded bare bottle.)

*Where the number 6 appears, 6 unabraded bare bottles, 6 abraded bare bottles, 6 not abraded coated bottles and 6 abraded coated bottles were tested.
**Some bottles didn't break. The internal pressure tester went to a maximum of 590 PSI.
***Coated abraded bottles not available from mold #14.

TABLE III

Impact (In/Sec) of empty bare versus coated bottles (28 oz. N.R. beverage - 17 oz. glass weight)

| Mold No. | No. of Bottles Tested in Each Test* | Bare Bottles | | | | | | Coated Bottles | | | | | |
|---|---|---|---|---|---|---|---|---|---|---|---|---|---|
| | | Not Abraded | | | Abraded | | | Not Abraded | | | Abraded | | |
| | | Min. | Max. | Ave. | Min. | Max. | Ave. | Min. | Max. | Ave. | Min. | Max. | Ave. |
| 6 | 6 | 80 | >125** | >107** | 55 | 85 | 64 | >125 | >125 | >125** | >125 | >125 | >125** |
| 3 | 6 | 105 | >125 | >118** | 60 | 80 | 70 | 100 | >125 | >120** | >125 | >125 | >125** |
| 10 | 6 | 75 | 115 | 95 | 65 | 90 | 78 | 105 | >125 | >119** | 95 | >125 | >118** |
| 12 | 6 | 100 | >125 | >115** | 60 | 75 | 68 | 115 | >125 | >123** | >125 | >125 | >125** |
| 8 | 6 | 100 | >125 | >119** | 60 | 80 | 73 | >125 | >125 | >125** | 100 | >125 | >120** |
| Average | | | | >111 | | | 71 | | | >122 | | | >123 |

Comparison No. 1  Bare (Not Abraded − Bare (Abraded)/Bare (Not Abraded)=111−71/111=40/111=36%  (The abraded bare bottles were 36% weaker than the not abraded bare bottles.)

Comparison No. 2  Coated (Not Abraded − Coated (Abraded)/Coated (Not Abraded)=122−123/122=0  (There was no difference in the impact strength of the abraded and unabraded coated bottles.)

Comparison No. 3 Coated − Bare/(Not Abraded) Bare=122−111/111=11/111=>+10%  (The not abraded coated bottles were greater than 10% stronger than the not abraded bare bottles.)

Comparison No. 4 Coated − Bare/(Abraded) Bare=123−71/71=>+73%  (The abraded coated bottles were greater than 73% stronger than the abraded bare bottles.)

*Where the number 6 appears, 6 unabraded bare bottles, 6 abraded bare bottles, 6 not abraded coated bottles and 6 abraded coated bottles were tested.
**Some bottles didn't break. 125 in/sec is the maximum force of the Impact Tester.

Of the 60 bare bottles tested, eleven didn't break while 49 of 60 of the coated bottles didn't break. As in the internal pressure test, the coated bottles proved to be considerably stronger (Comparison No. 4 shows that the coated bottles have an impact strength in excess of 73 percent over the bare bottle).

Example 9

Five unabraded bare bottles and five bottles coated as in Examples 1-6, but with 100 percent of the polyethylene-vinyl acetate copolymer, were filled with Club Soda at 4.3 volumes of carbonation and impact tested as in Example 8. The results of these tests are shown in Table IV.

TABLE IV

Impact (in/sec) of bare bottles and coated bottles filled with Club Soda.

| Bottle No. | Impact Necessary To Break Bottle (In/Sec) | Number of Impacts at 125 In/Sec Before Breaking | |
|---|---|---|---|
| Bare No. 1 | 65 | — | |
| Bare No. 2 | 70 | — | |
| Bare No. 3 | 105 | — | |
| Bare No. 4 | >125* | 3 | |
| Bare No. 5 | 115 | — | |
| Coated No. 1 | >125* | 108 | (Cap Loosened at 21st Impact) |
| Coated No. 2 | >125* | 38 | (Cap Loosened at 11th Impact) |
| Coated No. 3 | >125* | 106 | (Cap Loosened at 50th Impact) |
| Coated No. 4 | >125* | 2 | (Cap Did Not Loosen) |
| Coated No. 5 | >125* | 154 | (Cap Loosened at 75th Impact) |
| | | 81 Average | |

As shown in Table IV, all of the coated bottles and one of the bare bottles survived the impact test. Column 3 indicates an additional test wherein the surviving bottles were impacted repeatedly at the same spot on the shoulder bulb until they broke. The caps on the coated bottles loosened and released the internal pressure after the impacts shown. The test was continued in order to determine how many times the bottle had to be hit before the hammer penetrated to the coating and broke the bottle. As in the previous impact test of empty bottles, the coating protected the bottle and had to be penetrated before the bottle broke. Also, the bare bottles were very violent when broken whereas there was no flying glass when the coated bottles broke.

The bottles of the invention are preferably annealed prior to coating and it may be advantageous to apply a base coating for purposes of giving them lubricity during handling by applying a tin oxide or titanium trioxide coating directly adhered to the surface of the glassware at the time the virgin glass article is formed, and a second coating after the glass article is cooled such as a coating selected from the group of polyethylene, polyoxyethylene monostearate, morpholino stearate, triethanolamine stearate, or mixtures thereof.

The values given for glass wall thickness in the foregoing description, unless otherwise specified, refer to the thickness of glass in the side wall of bottles, which may have substantially thicker bottom portions.

While there has previously herein been described a method for obtaining partial adherence using an acidic polymeric material for the coating, there are also other manners and means by which partial adherence of the coating is obtained. For example, the glass container could be treated with an adhesive at spots over its surface followed by coating in the manner described herein with an inherently non-adherent coating material. Additionally, it is contemplated that the coating material could be applied to spots of adhesive on the glass surface in a sheet form rather than in powder form.

We claim:

1. Coated glassware having improved durability and resistance to shattering comprising: a glass container; and a coating extending substantially completely over the main exterior surface of said glass container, said coating being formed of a solid resilient locally distortable thermoplastic material uniformly adhered to said container by means of areas of adhession interspersed with non-adhered areas and being under tension to provide hoop strength, said coating being of a thickness sufficient to provide impact resistance to said container.

2. Coated glassware according to claim 1 wherein the side wall of said glass container has a mean thickness in the range of about 0.006 to about 0.150 ins. and a mean coating thickness in the range of about 0.006 ins. to about 0.030 ins.

3. Coated glassware according to claim 1 wherein the side wall of said glass container has a mean thickness in the range of about 0.030 to about 0.120 ins. and a mean coating thickness in the range of about 0.008 to about 0.016 ins.

4. Coated glassware according to claim 1 wherein the thickness of the glass container and the thickness of the coating are such as to result in a coated glassware article having an impact resistance of at least 120 ins. per second.

* * * * *

UNITED STATES PATENT OFFICE
CERTIFICATE OF CORRECTION

Patent No. __3,859,117__    Dated __August 11, 1975__

Inventor(s) __EDWARD R. CAMPAGNA AND MICHAEL ERCHAK__

It is certified that error appears in the above-identified patent and that said Letters Patent are hereby corrected as shown below:

The addresses of the inventors should read as follows:

Michael Erchak
289 Brookmere Ct.
Ridgewood, N.Y.  14845

Edward R. Campagna
409 Ridge Rd.
Horseheads, N.Y.  07450

The Claims should read as follows:

1. Coated glassware having improved durability and resistance to shattering comprising: a glass container; and a coating extending substantially completely over the main exterior surface of said glass container, said coating being formed of a solid resilient locally distortable thermoplastic material having an acid number in the range of about 0.5 to 20 uniformly adhered to said container by means of areas of adhesion interspersed with non-adhered areas and being under tension to provide hoop strength, said coating being of a thickness sufficient to provide impact resistance to said container.

2. Coated glassware according to claim 1 wherein the side wall of said glass container has a mean thickness in the range of about 0.006 to about 0.150 ins. and a mean coating thickness in the range of about 0.006 ins. to about 0.030 ins.

UNITED STATES PATENT OFFICE
CERTIFICATE OF CORRECTION

Patent No. 3,859,117      Dated August 11, 1975

Inventor(s) EDWARD R. CAMPAGNA AND MICHAEL ERCHAK

It is certified that error appears in the above-identified patent and that said Letters Patent are hereby corrected as shown below:

CLAIMS (Cont'd)

3. Coated glassware according to claim 1 wherein the side wall of said glass container has a mean thickness in the range of about 0.030 to about 0.120 ins. and a mean coating thickness in the range of about 0.008 to about 0.016 ins.

4. Coated glassware according to claim 1 wherein the thickness of the glass container and the thickness of the coating are such as to result in a coated glassware article having an impact resistance of at least 120 ins. per second.

5. Coated glassware according to Claim 1 wherein said locally distortable thermoplastic material comprises a material selected from the group consisting of oxidized polyolefins, oxidized waxes and polymers comprising an ethylenically unsaturated carboxylic acid or acid anhydride component.

6. Coated glassware according to Claim 1 wherein said locally distortable thermoplastic material comprises an ethylene acrylic acid copolymer.

7. Coated glassware according to Claim 1 wherein said locally distortable thermoplastic material has an acid number in the range of about 1 to 15.

8. Coated glassware according to Claim 1 wherein said locally distortable thermoplastic material has an acid number in the range of about 1 to 9.

Signed and Sealed this seventh Day of October 1975

[SEAL]

Attest:

RUTH C. MASON
*Attesting Officer*

C. MARSHALL DANN
*Commissioner of Patents and Trademarks*